July 18, 1950 — M. GOLDBERG — 2,515,214
METHOD OF MEASURING OUT-OF-ROUNDNESS OF MACHINED PARTS
Filed June 21, 1946 — 4 Sheets-Sheet 1
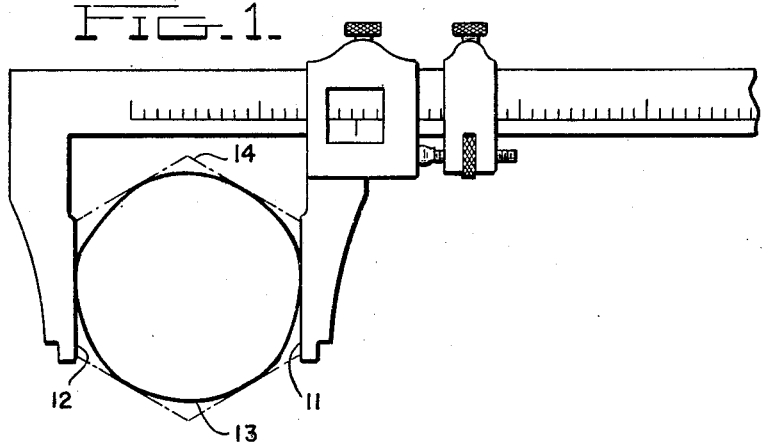
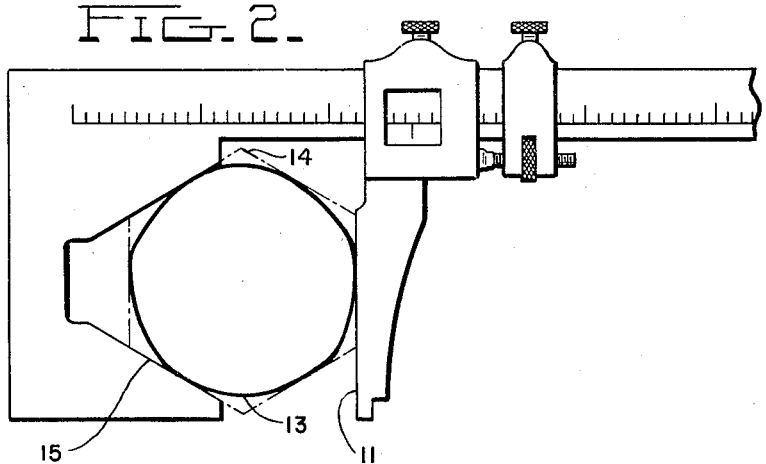
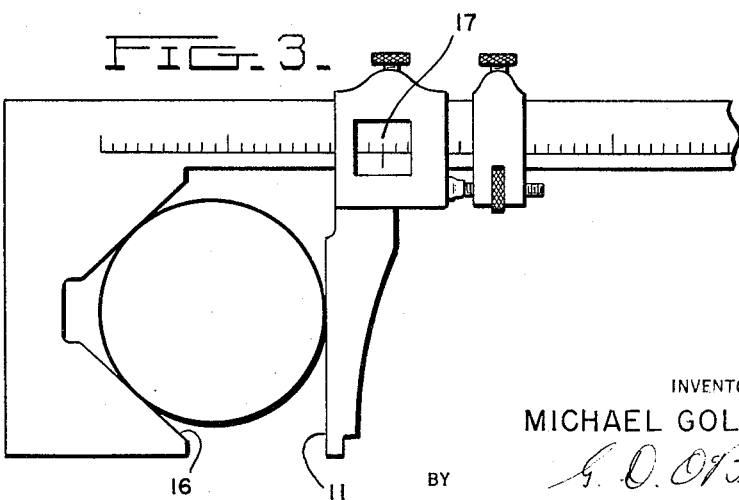
INVENTOR
MICHAEL GOLDBERG
ATTORNEY July 18, 1950
M. GOLDBERG
2,515,214
METHOD OF MEASURING OUT-OF-ROUNDNESS
OF MACHINED PARTS
Filed June 21, 1946
4 Sheets-Sheet 2
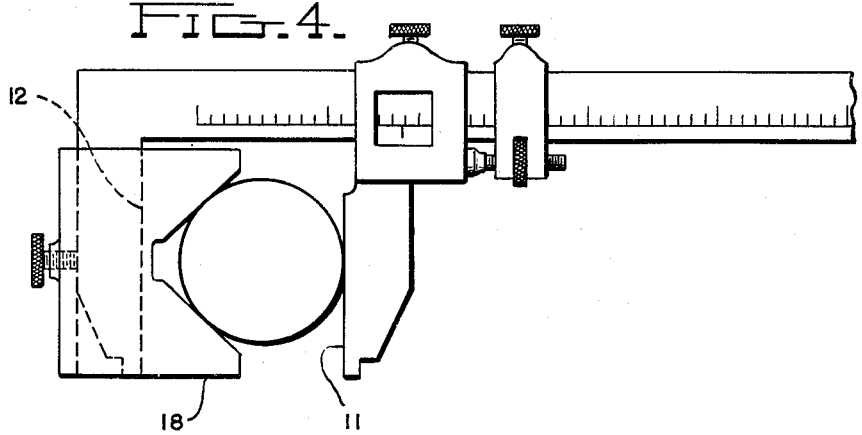
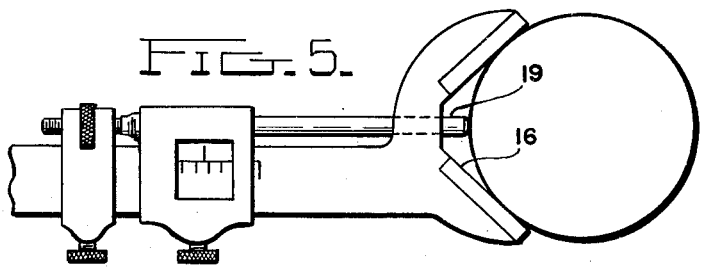
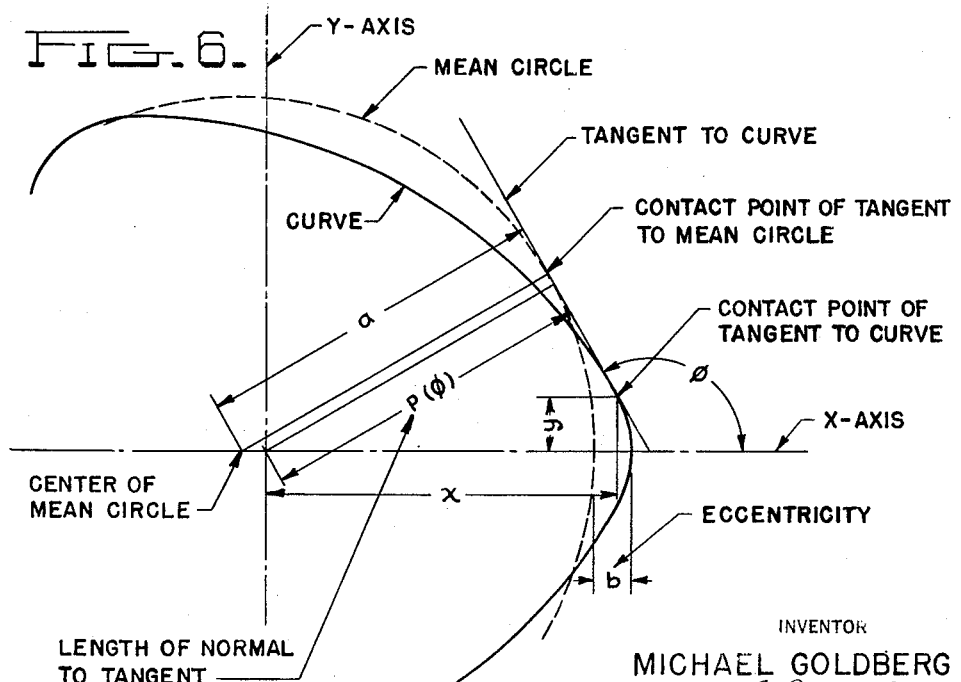
INVENTOR
MICHAEL GOLDBERG
BY
ATTORNEY

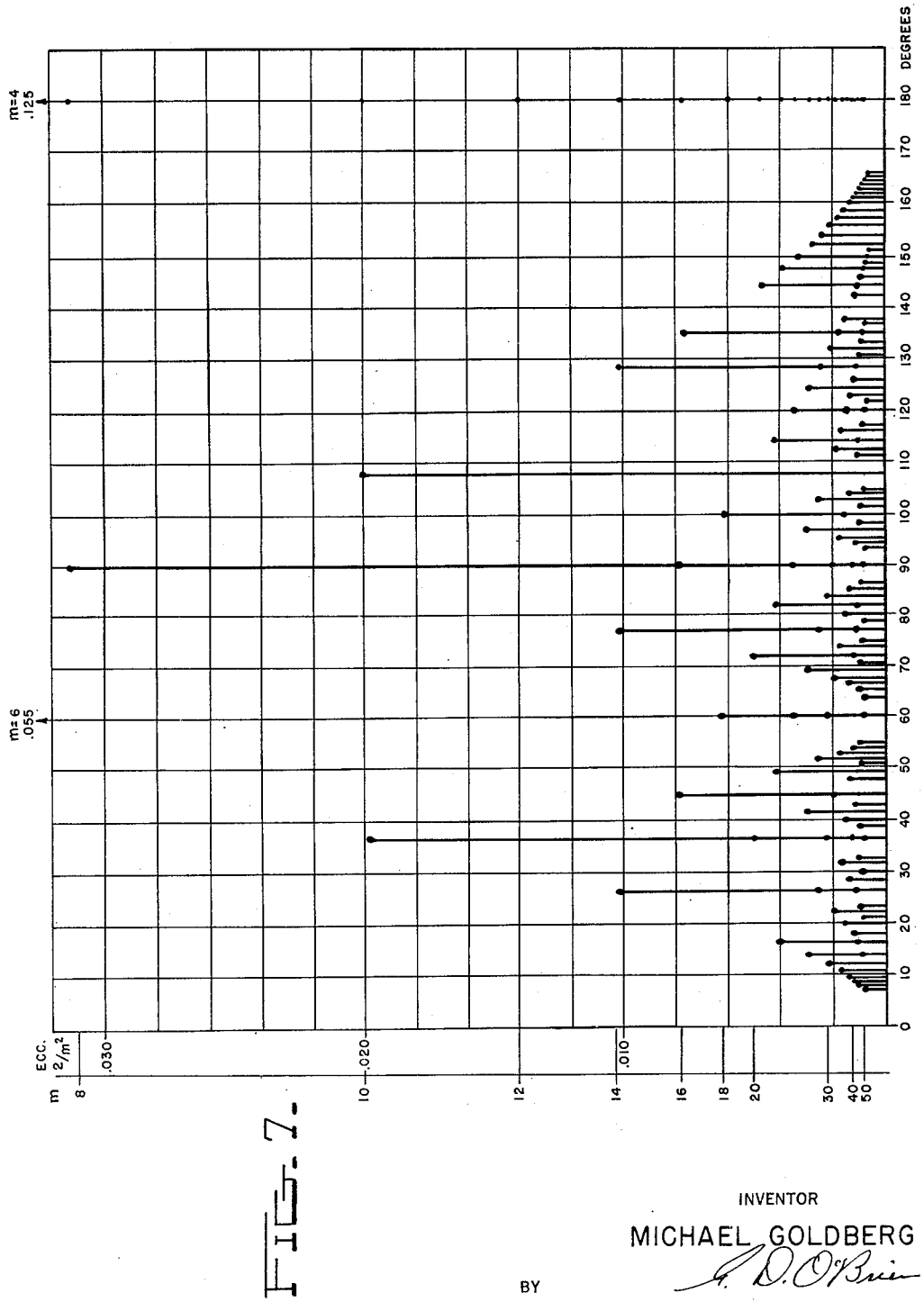

July 18, 1950 M. GOLDBERG 2,515,214
METHOD OF MEASURING OUT-OF-ROUNDNESS
OF MACHINED PARTS
Filed June 21, 1946 4 Sheets-Sheet 4

INVENTOR
MICHAEL GOLDBERG
BY
ATTORNEY

Patented July 18, 1950

2,515,214

UNITED STATES PATENT OFFICE 2,515,214

METHOD OF MEASURING OUT-OF-ROUNDNESS OF MACHINED PARTS

Michael Goldberg, Washington, D. C.

Application June 21, 1946, Serial No. 678,185

1 Claim. (Cl. 33—178)

(Granted under the act of March 3, 1883, as amended April 30, 1928; 370 O. G. 757)

The roundness of tubes, bars, gun barrels, cones, pipes and other structures having external or internal surfaces of circular cross-section is usually measured by relatively rotating the structure and a caliper. The variation of the diameter as measured by the caliper is taken as a measure of the eccentricity or out-of-roundness of the surface. Such measurements are of prime importance in the testing of submarine hull, torpedoes, gun tubes, pipes, and other structure that may be subjected to fluid pressures either from the outside or from the inside. For example, the hull of a submarine when measured by the conventional caliper method may indicate perfect circularity, yet it may be proved by more accurate methods or even by visual inspection that the surface is not at all round. Any departure from perfect circularity will not only impair the efficiency of the vessel but will also subject it to unnecessary and tremendous stresses that may in some cases actually crush the hull.

Eccentricities in structures that are designed to be circular are due in most instances to irregularities in methods of manufacture. An obvious source of error is an improper adjustment in a centerless grinder. Other causes are chattering cutting tools and loose or worn bearings in a lathe. Similarly, the shape of a bar before turning may lead to eccentricity. Thus, if a bar of square cross-section is rough-turned to a cylinder, the deflection of the cutting tool when cutting the corners is greater than when cutting the sides, and this is likely to produce high spots at the corners. Some materials are deformed by improper handling. Others are warped by internal stresses in castings, forgings, and heat-treated metals, and by aging and evaporation in plastics.

If a cross-section is taken of a seemingly round structure, it will, of course, define a closed curve. Many such curves are so developed that when positioned between two parallel lines representing the plane parallel faces of a line caliper (or the two points of a point caliper) they will be found to be rotatable between these parallel lines without at any time losing contact with both parallel lines. So far as the conventional caliper method of measuring eccentricity is concerned, it is only necessary and sufficient that the rotating curve maintain contact with the two points or faces of the caliper, in order to indicate circularity. Since it can be demonstrated mathematically that there are many such curves that satisfy these conditions and yet are not circular, it will be evident that the conventional method of testing eccentricity is defective. Consequently, a caliper with two points or with plane parallel faces can not be relied on to give valid results.

The point-to-point caliper is, of course, the equivalent of an instrument with plane parallel faces, so far as detecting eccentricity is concerned. Moving a point-to-point external caliper back and forth around the work gives the same results as rotating the work between the plane faces of a caliper with flat jaws. As already indicated, such results are not reliable.

The present invention is concerned primarily with the design of an instrument for detecting or measuring eccentricity. For this purpose, it is contemplated that the caliper for measuring external surfaces have one jaw or face so formed that it is angular. The angle is so chosen that the device will be able to detect certain types of eccentricity. If desired, the complementary straight face may be either opposed to the angular detecting face or it may be on the same side, as will be made apparent more particularly hereinafter.

The conventional point-to-point internal caliper that is used for internal surfaces is defective, for the same reasons. This invention also provides means for rectifying the error and for detecting eccentricity in internal curves.

The invention will be described in greater detail with the aid of the accompanying drawings, which form part of this specification.

In the drawings,

Fig. 1 shows one form of non-circular convex curve that may be rotated between the two parallel plane faces of a conventional caliper while maintaining contact with these faces at all times.

Fig. 2 shows the same curve in a caliper having a wedge angle that passes the particular curve as circular.

Fig. 3 shows a caliper having a wedge angle of the proper value to detect eccentricities, in accordance with the principles of the invention.

Fig. 4 shows a caliper giving the same results as that of Fig. 3, but having a wedge face that is mountable on a conventional caliper with plane parallel faces.

Fig. 5 shows another caliper for detecting eccentricities, but having both anvils on the same side.

Fig. 6 is a graph illustrating a mathematical analysis of the principles of the invention.

Fig. 7 is a graph indicating how the caliper wedge angle is chosen.

Figure 8:
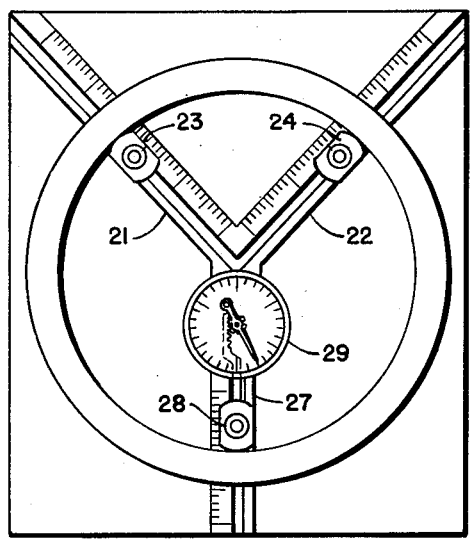
Fig. 8 is a caliper constructed in accordance with the principles of the invention, for measuring internal diameters.

It can be shown mathematically that within every regular polygon a non-circular curve can be inscribed touching each and every side of the polygon. Among all such curves that can be so inscribed in a given regular polygon, there is one extreme case that is characterized by sharp corners. All the other inscribable curves for that particular polygon may be derived as parallel curves of this extreme curve.

A parallel curve to a given curve is the locus of points on the normals to the given curve at a constant distance from the given curve.

All inscribed curves may be divided into two classes: namely, those inscribable in a regular polygon of an even number of sides, and those inscribable in a regular polygon of odd sides. As used herein, the terms odd and even refer to the number of sides of the regular polygon in which the curve is inscribed.

The eccentricity of curves inscribable in regular polygons of an odd number of sides will be readily detected by the usual caliper with flat faces. The reason for this is that the number of bulges of the inscribed curve, being even where the number of sides of the regular polygon is odd, cannot be rotated between two parallel faces. Accordingly, the kind of curve above described that can be inscribed in a regular triangle, pentagon, or similar odd numbered polygon can be readily checked for roundness by the ordinary flat face caliper.

On the other hand, the curves inscribable within squares, hexagons, octagons, and other even numbered regular polygons may be passed as round by such a caliper, even when in fact they are not round, because due to the odd number of bulges of the curve, there will always be a high point corresponding to a low point, so that the curve may be rotatable with the same two parallel faces without at any time losing contact with the two parallel faces.

The primary object of this invention is to devise some method of detecting the even polygon curves, since these will pass unnoticed within the flat faces of a conventional caliper. Angular faces may be used, some more effectively than others. Some angles are particularly unsuitable since they too will pass certain curves. These unsuitable angles are the angles between the alternate sides of a regular polygon of an even number of sides, for they will pass non-circular curves that would pass by the flat angle test also. Similarly, a wedge angle equal to the angle between any pair of sides separated by an odd number of sides will not detect non-circularity of even polygon curves.

The following is an analysis of a noncircular convex curve that may be rotated within two or more fixed lines and yet remain in contact with all of these lines at all times, with particular reference to Fig. 6 of the drawings.

Take a regular polygon of $m$ sides and denote the magnitude of any one of its external angles by the letter $\theta$. It is required to construct such a curve C that it may rotate within the polygon and yet keep in contact with all of the sides at all times. For such a curve it is necessary and sufficient that the normals at the points of contact of the curve with the side of the polygon be concurrent, that is, that they intersect at a point. This point represents the instantaneous center of rotation and will, of course, vary as the curve is rotated. It follows from plane geometry that since the polygon is regular the sum of these normals will remain constant. The area of a regular polygon may be divided into triangles whose bases are the sides of the polygon and whose altitudes are the perpendiculars from any point in the polygon to these sides. Since this constant area is equal to half the sum of these altitudes multiplied by one of the bases, the sum of the altitudes must be constant. This sum will equal $m$ times the radius of an inscribed circle of the polygon. This circle, of course, will be fixed depending on the size and the number of sides of the polygon and will be independent of the position of the instantaneous center of rotation.

Construct the polygon about the center of rotation in such a way that one of the sides will make the angle $\phi$ with the horizontal axis of the system of co-ordinates. The desired curve is inscribed within this polygon. Let one side of the polygon coincide with a tangent T to the curve so that the tangent makes the same angle $\phi$ with the axis. Then, since the polygon is regular, the sum of the normals is constant and is equal to $m$ times $a$, where $a$ is the radius of the inscribed circle. The equation representing the sum may be set forth as Equation 1.

$$ma = p(\phi) + p(\phi+\theta) + p(\phi+2\theta) + \ldots + p(\phi+(m-1)\theta) \quad (1)$$

In this equation, $p(\phi)$ denotes the distance of the initial side of the polygon from the origin of co-ordinates. It should be noted that this distance is taken from the origin to the tangent T of the curve (or the side of the polygon), and that it does not represent the distance from the origin to the point of contact of the curve with the polygon.

Instead of keeping the polygon fixed and revolving the curve within it to maintain contact with all sides at all times, we may consider the curve as fixed. If the surrounding regular polygon is rotated so as to keep in contact with the curve within it, Equation 1 may be represented in polar tangential form as Equation 2

$$p(\phi) = a + \cos\phi \cdot F(\phi) \quad (2)$$

Let $F(\phi)$ be so determined that it is a simple period function with a period $\theta$. Therefore $F(\phi)$ can be represented by Equation 3

$$F(\phi) = F(\phi+\theta) = F(\phi+2\theta) = \ldots = F(\phi+(m-1)\theta) \quad (3)$$

From geometry we have equation 4

$$\cos\phi + \cos(\phi+w) + \cos(\phi+2w) + \ldots + \cos(\phi+(m-1)w) = \cos\tfrac{1}{2}(2\phi+(m-1)w)\sin\tfrac{m}{2}w/\sin\tfrac{w}{2} \quad (4)$$

where $w$ is any angle.

Because the polygon is regular, $\theta$, the external angle, equals $$\frac{2\pi}{m}$$

and consequently we have Equation 5

$$\cos\phi + \cos(\phi+\theta) + \cos(\phi+2\theta) + \ldots + \cos(\phi+(m-1)a) = 0 \quad (5)$$

$F(\phi)$ satisfies the condition set forth in Equation 3 if we evaluate it as $$F(\phi) = f\left(\tan\frac{m}{2}\phi\right) \quad (6)$$

where $f$ denotes any arbitrary one-valued function whatsoever. Substituting in Equation 2 we have Equation 7

$$p(\phi)=a+\cos\phi\cdot f\left(\tan\frac{m}{2}\phi\right) \quad (7)$$

which represents the polar tangential equation of a curve that may be rotated within a regular polygon of $m$ sides while it maintains contact with all the sides at all times.

It can be shown that the normals to the sides of the polygon at the point of contact are concurrent for such a curve, for Equation 8

$$\begin{vmatrix} \cos\phi & \sin\phi & p'(\phi) \\ \cos\left(\phi+\frac{2\pi}{m}\right) & \sin\left(\phi+\frac{2\pi}{m}\right) & p'\left(\phi+\frac{2\pi}{m}\right) \\ \cos\left(\phi+\frac{4\pi}{m}\right) & \sin\left(\phi+\frac{4\pi}{m}\right) & p'\left(\phi+\frac{4\pi}{m}\right) \end{vmatrix}=0 \quad (8)$$

is fulfilled for any value at all of $\phi$.

Take Equation 9

$$f=\frac{b}{1+\tan^2\frac{m}{2}\phi}=b\cos^2\frac{m}{2}\phi \quad (9)$$

where $b$ is a positive constant. Then, substituting in Equation 7, we have $$p(\phi)=a+b\cos\phi\cdot\cos^2\frac{m}{2}\phi \quad (10)$$

$$p'(\phi)=-b\sin\phi\cos^2\frac{m}{2}\phi-\frac{m}{2}b\cos\phi\sin m\phi \quad (11)$$

$$p''(\phi)=-b\cos\phi\cos^2\frac{m}{2}\phi+mb\sin\phi\sin m\phi-\frac{m^2}{2}b\cos\phi\cos m\phi \quad (12)$$

The Cartesian co-ordinates of the point of contact of the side T of the regular polygon making an angle $\phi$ with the initial X-axis are, in general, Equations 13 and 14

$$x=p(\phi)\sin\phi+p'(\phi)\cos\phi \quad (13)$$

$$y=-p(\phi)\cos\phi+p'(\phi)\sin\phi \quad (14)$$

See "Differentialgleichungen Lösungenmethoden und Lösungen," E. Kamke, 3rd edition (1944), p. 171.

Again it is to be noted that the point of contact of the curve C with the side T of the polygon is different from the perpendicular normal point.

Substituting Equation 1 in Equation 13 we have Equations 15 and 16

$$x=a\sin\phi-\frac{m}{2}b\cos^2\phi\sin m\phi \quad (15)$$

$$y=-a\cos\phi-b\cos^2\frac{m}{2}\phi-\frac{m}{4}b\sin 2\phi\sin m\phi \quad (16)$$

It follows from the form of the Equations 15 and 16 that the curve is closed and that no part thereof goes to infinity.

Therefore, the curve of which the polar tangential equation is $$p(\phi)=a+b\cos\phi\cdot\cos^2\frac{m}{2}\phi \quad (17)$$

represents a closed convex curve that is inscribable in a regular polygon of $m$ sides and rotatable in it while it keeps in contact with all the sides at all times.

By inspection, it will be observed that this curve has two forms, depending on whether $m$ is odd or even. When $m$ is odd, the curve is symmetrical with respect to the Y-axis and to the straight line $$y+\frac{b}{2}=0$$

which is parallel to the X-axis. When $m$ is even, the curve is symmetrical with respect to the Y-axis only.

It is obvious that a curve rotatable in a regular polygon of $2m$ sides is also rotatable in a regular polygon of $m$ sides, if the two polygons have the same inscribed circle in common.

The polar tangential equation of the inscribed curves may be given by Equation 17, where $\phi$ is the orientation of the tangent T to the curve C, and $p(\phi)$ is the distance of this tangent from the origin, provided $b$ is equal to or less than $$\frac{2a}{m^2}$$

The extreme case where the curve has sharp corners is obtained by taking $b$ equal to $$\frac{2a}{m^2}$$

and therefore $$\frac{2}{m^2}$$

may be taken as a measure of the eccentricity of the sharp cornered curve. In consequence, as $m$ increases, this measure of non-circularity decreases rapidly. In other words, as the number of sides of the polygon increases, the inscribed curve rapidly approaches the form of a circle.

As hereinbefore indicated, the primary object of this invention is to devise a caliper that can detect non-circularity of a closed convex curve that can be inscribed and rotated within a regular polygon of an even number of sides. A caliper having one flat face and one angular face is used for this purpose, and it is required to ascertain the angle of the angular face so that it will be most efficacious in detecting non-circularity of the curves hereinbefore mentioned. In such a caliper, one base of the polygon may be assumed to be in contact with the flat face of the caliper, and the curve is positioned so that the polygon is symmetric with respect to the angular face of the caliper. It can be shown that there are no non-circular closed curves which can rotate in a triangle and keep contact with the three sides of the triangle at each orientation unless the sides of the triangle lie on the sides of some regular polygon. Therefore, if one wishes to make an effective gage employing three contacts for detecting or measuring eccentricity (out-of-roundness), the choice of these contacting faces must be made so that these faces do not lie on the faces of a regular polygon.

In Fig. 1 is shown a conventional caliper having a flat face 11 and a second flat face 12 parallel thereto. Suppose it is required to detect non-circularity of a curve 13. If this curve 13 were inscribable in a regular polygon of odd sides, the caliper of Fig. 1 could be efficacious for the desired purpose, as hereinbefore described, because the curve could not rotate within the caliper. If however, the curve 13 is inscribable in a regular polygon 14 of an even number of sides, such as the hexagon shown, it will be obvious, in view of the preceding analysis, that the curve 13 may be rotated, or conversely, that the caliper may be rotated about the curve 13, without at any time losing contact between the curve 13 and the two faces 11 and 12. In such a case, the caliper will not detect non-circularity of the curve.

In Fig. 2 is shown the same curve 13. The caliper, however, has an angular face 15 in place of the straight face 12 of Fig. 1. Let it be assumed that the angle is 60 degrees. It will be apparent that the polygon within which the curve may be rotated concurs with the wedge angle of 60 degrees, since the alternate sides of the hexagon make this angle with each other. Consequently, the curve 13 may be rotated within the caliper of Fig. 2 and maintain contact with both sides of the angular face 15 as well as with the flat face 11, even though in fact it is not circular. As a result, this caliper, too, will be unreliable for checking surfaces. Indeed, since the maximum eccentricity of the curve 13 is $$\frac{2}{m^2}$$

$$\text{max. ecc.} = \frac{2}{m^2} = \frac{2}{6^2} = 0.055$$

In other words, if the wedge angle of the face 15 is 60 degrees, convex surfaces having an eccentricity of .055 may pass as round. Conversely, a caliper face 15 having an angle of 60 degrees, as well as a face 12 of 180 degrees is unsuitable for detecting eccentricity if the polygon within which the curve is inscribable has six sides.

The deviation angle, i. e., the exterior angle between the extension of one side and its next adjacent side of a regular polygon of $m$ sides is $\theta = 2\pi/m$. Therefore, the angle between a pair of alternate sides is $\pi - 4\pi/m$. In general, the angle between a pair of sides separated by an odd number of other sides is $\pi - 4K\pi/m = \pi(1 - 4K/m)$ where K is an integer.

Therefore, the poorest wedge angles for use in an eccentricity gage is given by $\pi(1 - 4K/m)$ where $K/m$ is a proper fraction in its lowest terms and $m$ is a small even number. For example, when $m=6$, and $K=1$, then $\pi(1 - 4K/m) = \pi/3 = 60°$. In this case there are curves of eccentricity $2/m^2 = 2/36 = 1/18$ which will pass as round. For $m=8$, and $K=1$, then $\pi(1 - 4K/m) = \pi/2 = 90°$. In this case there are curves of eccentricity $2/m^2 = 2/64 = 1/32$ which will pass as round.

A chart or graph can be prepared to show the unsuitable angles for various inscribable curves. Such a graph is shown in Fig. 7. On this graph, the abscissa of each vertical line represents an unsuitable angle derived from a regular polygon of $m$ sides while the ordinate, which is $2/m^2$, is the extreme eccentricity of inscribable and rotatable curves described herein. Some angles are obtainable from different values of $m$ and different values of K; therefore several values of eccentricity shown by the small black circles lie on the corresponding vertical lines. It will be seen from this figure, for example, that both 60 degrees and 90 degrees are unsuitable. The figure represents all such unsuitable or bad angles for detecting curves inscribable in polygons having the listed number of sides, the number of sides $m$ and the maximum eccentricity being shown on the Y-ordinate.

The problem resolves itself, therefore, into finding a wedge angle that will effectually detect non-circular curves. Common angles like 30, 45, 60, 90, 120, and 180 will all pass many non-circular curves as circular.

Even though the selected angle for the supporting wedge angle of an eccentricity gage is not an angle of a regular polygon, it may always be approximated by such a polygon angle to any degree of accuracy by taking a polygon of a sufficiently large number of sides. In actual practice, the wedge angle will have certain manufacturing allowances or tolerances. Therefore, instead of a mathematically exact selected angle, one must consider the effectiveness of the totality of angles in a small range of angles. Since the possible eccentricities of curves associated with a polygon will decrease as the square of the number of sides of the polygon, it is important to select an angle such that, over the range of the angles manufactured to the specification of a given angle and its tolerances, none of the angles are exactly equal to the angle of a regular polygon of a small number of sides.

Furthermore, an angle close to the angle of a regular polygon is not sensitive to eccentric curves belonging to that polygon. Therefore, it is desirable to select angles as far as possible from poor angles. As one moves away from one poor angle, one will approach another poor angle. It is desirable to choose the angle by weighing the eccentricity hazards of the nearby angles. For example, a satisfactory wedge angle may be selected from the chart which is the approximate mean of a range of angles over which there are no vertical lines, i. e., there are no angles within the foregoing range equal to $\pi(1 - 4K/m)$ where $m$ is an integer equal to $$\sqrt{\frac{2}{e}}$$

$e$ being the lowest value of eccentricity that will not be detected by the angle expressed by $\pi(1 - 4K/m)$ where K is any integral value less than $m/4$.

It is best to use the approximate mean of such a range because it will be observed from the chart that an angle of, say 59° will not pass any curves in the range shown, that is up to $m=55$. Theoretically an angle of 59 degrees would be excellent for detecting non-circular curves. It should be noted however, that this is so close to 60 degrees that it may pass many of the non-circular curves that are passed by the 60 degree angle, unless the operator is extremely careful and unless the instrument is extremely sensitive. For these reasons, it is desirable to have an angle somewhat removed from those that are definitely unsuitable. A preferred angle would be closer to 86 degrees. This is four degrees removed from a right angle and is enough to distinguish therefrom and is not too close to the next vertical line although its lower eccentricity is favored. A wedge angle of 86 degrees will pass, as noted in Fig. 7, a curve inscribable in some regular polygon of more than 50 sides when such a curve is not completely circular, but the maximum eccentricity of such a curve will be only $$\frac{2}{m^2}$$

This amounts to 0.0008 for $m=50$. Such eccentricity is so low as to be negligible for most practical purposes. In effect, therefore, such a curve may be called round. A wedge angle having an error of one degree on the low side of the angle of 86 degrees will pass a curve inscribable in a polygon having more than 45 sides, which would also involve an error so low as to be practically negligible.

By the same token, an angle of 94 degrees, will be highly suitable for detecting non-circular curves. This, too, is sufficiently removed from 90 degrees to avoid error due on that account, so that any curves that will be passed by a 95 degree caliper will be substantially round.

What is required therefore, is a caliper having one flat face 11 and an angular face 16 opposing the flat face 11, the angle being so chosen as to detect curves that are in fact non-circular up to a certain degree. This angle may be close to 86 degrees or 94 degrees or some other similarly chosen angle. The diameter that is to be measured may be read directly on a suitable scale 17.

In practice, a caliper with parallel faces 11 and 12 will first be used to detect non-circular curves that may be inscribed in polygons having an odd number of sides, as already indicated. Those curves that are passed as apparently round by the parallel faced caliper, will then be inserted in a caliper having the angular face 16, and such caliper will detect eccentricities that would otherwise remain undetected.

If desired, a wedge face 18 may be machined to fit over the flat face 12 so that only one caliper need be used.

As shown in Fig. 5, the flat face usually opposing the angular face 16 may comprise a member 19 on the same side. Such a device will be particularly useful for detecting or measuring large curves or surfaces.

Any of the calipers may have a gage or vernier for measuring the departures from circularity.

For measuring bores internally, a device such as that shown in Fig. 8 may be employed. This utilizes the same principles. The two arms 21 and 22 are fixed relatively to each other at the desired angle of 86 degrees or 94 degrees or other chosen value. The end of each arm has a telescopic contact 23 or 24, respectively. The instrument is adapted to be inserted into the bore, as close to the center as possible. The contacts 23 and 24 are then slid along the arms 21 and 22 until they make contact with the internal surface of the bore, and are then clamped into position on the arms 21 and 22. A third arm 27, symmetrically positioned with respect to the arms 21 and 22 in fixed relationship thereto, has a slidable telescopic contact 28. The contact is free to slide on the arm 27 at all times. The device is rotated (or the bore is rotated), and the movement of the contact 28 may be read on the gage 29. Whereas an angle of 60 degrees between the arms 21 and 22 would be unsuitable, for the reasons already specified, and would pass as round curves that actually have an eccentricity of as much as 0.055, an angle of 86 degrees will readily detect an eccentricity as small as 0.0008.

An apparently round internal curve of this class is such that a regular polygon of any given odd number of sides can be inscribed within it and made to rotate within it so that all the vertices of the polygon retain contact with the curve at all positions of the polygon. These curves are not necessarily constant width curves that are inscribable and rotatable in a regular polygon. Such an internal curve may be obtained by tracing the path of any vertex of a regular polygon of any given odd number of sides, which polygon is made to rotate about a fixed inscribable curve that keeps contact with all sides of the polygon. Since the polygons dictate the critical angles, the angles that are unsuitable for the constant width or external curves are similarly unsuitable for the internal curves hereinbefore mentioned.

Figure 9:
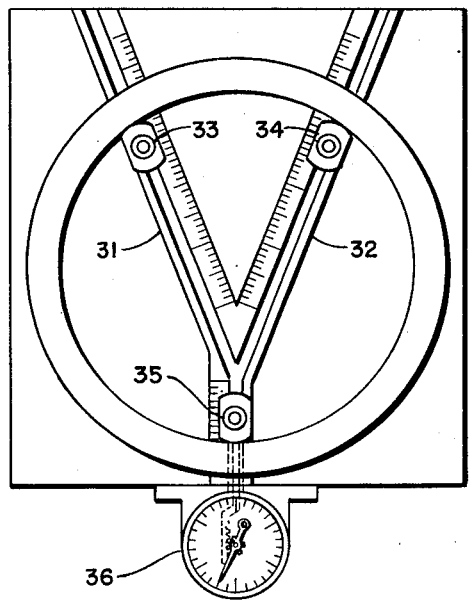
Fig. 9 is another form of the instrument shown in Fig. 8.

In another form of the internal caliper, shown in Fig. 9, the two arms 31 and 32 may be fixed at half the suitable angle, such as 43 or 47 degrees. The contacts 33 and 34 are moved along the arms 31 and 32 until they contact the sides of the bore and are then fixed in position. The apex of the angle has a movable contact 35 that is movable and in contact with the bore at all times during relative rotation if the bore and the caliper, and the movement of this contact 35 may be read on the gage 36. The device will operate the same way as that shown in Fig. 8.

It will be seen, therefore, that a caliper constructed in accordance with the principle of the invention will be highly useful in detecting or measuring eccentricities of either internal or external curves.

The invention described herein may be manufactured and used by or for the Government of the United States of America for governmental purposes without the payment of any royalties thereon or therefor.

I claim:

The method of measuring out-of-roundness of a machined part to detect any eccentricity $(e)$ in said part comprising plotting points on Cartesian coordinates of a series of angles $(\angle)$ corresponding to each of a plurality of values of eccentricity $(e)$, said plurality of values of eccentricity $(e)$ being expressible by the equation $e = 2/m^2$ wherein $m$ includes all integral values up to the computed $m$ for the selected eccentricity $(e)$, said series of angles for each value of eccentricity being obtained from the equation $\angle = \pi(1 - 4K/m)$ wherein $K$ takes all integral values from 1 up to $m/4$, selecting from said plot the approximate mean of the range of angles between any pair of immediately consecutive points, cutting a notch having an angular value approximately equal to said selected value, placing said part in said notch, bringing an indicator into contact with said part, and noting the deviations of the indicator during rotation of said part in said notch.

MICHAEL GOLDBERG.

REFERENCES CITED

The following references are of record in the file of this patent:

UNITED STATES PATENTS

| Number | Name | Date |
|---|---|---|
| 868,074 | Clark | Oct. 5, 1907 |
| 878,439 | Wagniere | Feb. 4, 1908 |
| 1,617,005 | Ames | Feb. 8, 1927 |
| 1,659,915 | Hilfiker | Feb. 21, 1928 |
| 2,197,198 | Street | Apr. 16, 1940 |
| 2,303,007 | Thomason | Nov. 24, 1942 |

FOREIGN PATENTS

| Number | Country | Date |
|---|---|---|
| 452,940 | France | Mar. 20, 1913 |
| 455,963 | Germany | Feb. 13, 1928 |
| 474,098 | Germany | Mar. 26, 1929 |
| 582,636 | Great Britain | Nov. 22, 1946 |